United States Patent [19]

Bieniosek et al.

[11] 4,033,399

[45] July 5, 1977

[54] METHOD FOR CLADDING COPPER AND COPPER ALLOYS TO STEEL SUBSTRATES

[75] Inventors: Chester E. Bieniosek, McKeesport; Robert H. Kachik, Washington Township, Westmoreland County; Arthur J. Pignocco, Franklin Township, Westmoreland County, all of Pa.

[73] Assignee: United States Steel Corporation, Pittsburgh, Pa.

[22] Filed: July 16, 1976

[21] Appl. No.: 705,848

[52] U.S. Cl. .................................. 164/54; 164/98; 164/103; 228/241; 427/192; 428/677
[51] Int. Cl.² .................. B22D 19/08; B23K 23/00
[58] Field of Search ............... 164/54, 92, 98, 103; 228/198, 241; 106/1; 427/192, 225; 29/196.3

[56] References Cited

UNITED STATES PATENTS

| | | | |
|---|---|---|---|
| 3,033,672 | 5/1962 | Rejoak | 164/54 X |
| 3,234,603 | 2/1966 | Leuthy et al. | 164/54 X |
| 3,255,498 | 6/1966 | Leuthy et al. | 164/54 X |
| 3,264,696 | 8/1966 | Funk | 164/54 |
| 3,396,776 | 8/1968 | Funk | 164/54 |
| 3,942,579 | 3/1976 | Guntermann | 164/54 |
| 3,946,793 | 3/1976 | Kachik et al. | 164/54 |

*Primary Examiner*—Ronald J. Shore
*Assistant Examiner*—Gus T. Hampilos
*Attorney, Agent, or Firm*—Forest C. Sexton

[57] ABSTRACT

A method of cladding copper or copper alloys to a steel substrate by an aluminothermic reduction reaction utilizing an exothermic reaction material which is principally a mixture of calcium-silicon alloy, aluminum, cupric oxide and a metal.

3 Claims, No Drawings

METHOD FOR CLADDING COPPER AND COPPER ALLOYS TO STEEL SUBSTRATES

This invention relates to the production of copper coated steel articles, and particularly to an improved method and improved materials for producing and metallurgically bonding a relatively thick copper or copper alloy coating onto the surface of a steel substrate utilizing a modified aluminothermic reduction (ATR) reaction. The resulting composite can be used as is, or in the case of plate substrates, it can be hot and cold rolled to lighter gage material such as clad plate, sheet or strip.

The closest prior art known to applicants is embodied in the following patents:
Carpenter et al U.S. Pat. No. 2,515,191
Funk U.S. Pat. No. 3,264,696
Funk U.S. Pat. No. 3,396,776

Although copper and copper alloys can readily be electrolytically deposited on metallic substrates to produce thin layers, known methods for depositing relatively thick layers of copper or copper alloy, i.e. more than about one-half-inch, onto steel substrates are slow and costly. For example, one known method for applying a thick copper coating onto a steel substrate is to use bulk welding apparatus and making a multitude of passes across the surface. Another method is to use explosive-bonding techniques, which requires tedious surface preparation.

It is also known that ATR reactions can be utilized to generate and weld a reduced copper phase to a steel substrate. This method has been used, for example, to attach copper electrical cables to the webs of steel rails. Nevertheless, ATR reactions have not been very successful in depositing thick copper coatings on large steel surface areas. This is because the ATR reaction mixtures previously used for obtaining reduced copper phases have certain deficiencies which render them unsuitable for cladding large surface areas. Specifically, the reaction of cupric oxide (CuO) with aluminum (Al) to yield copper (Cu) metal, and alumina ($Al_2O_3$) slag is known to be explosively violent. The violent reaction stems from the fact that sufficient excess heat is liberated to vaporize some of the reduced Cu metal. Accordingly, various methods of controlling the degree of superheat achieved in the Cu phase have been devised. These methods include: (1) replacing cupric oxide (CuO) with cuprous oxide ($Cu_2O$) and/or (2) adding inert materials, such as lime, fluorite or metallic Cu to the blend. Lime and/or fluorite additions impart an additional benefit by fluxing the alumina slag and thus ensuring better slag metal separation. However, large additions are usually required which add to the cost of the process and produces an excessive amount of slag. On the other hand, the use of $Cu_2O$ or Cu metal produces a virtually pure $Al_2O_3$ slag and as a consequence, there is large discrepancy between the melting points of the reduced metal and slag phases. This large discrepancy in melting points can lead to entrapment of gases between the solid slag phase and the still molten metal phase which can then cause defects in the surface of the deposit copper metal.

This invention is predicated upon our development of an improved ATR mixture for depositing reduced copper and copper alloys which does not vaporize the reduced metal when reacted, and which yields a slag having a melting point only slightly above that of the deposited metal. This new ATR mixture thus provides a fast and simple method for deposing copper and copper alloys onto steel substrates to practically any desired thickness.

Accordingly, an object of this invention is to provide a critically formulated ATR reaction mixture which performs better and is less expensive than ATR reaction mixtures which are normally used for obtaining reduced copper phases.

Another object of our invention is to provide a fast, economical and simple method of cladding copper on steel surfaces.

Still another object of our invention is to provide a method for producing copper-clad steel whereby there is no upper limit as to the thickness of copper which can be applied.

A further object is to provide a method of producing a copper-clad steel composite which can undergo forming and rolling operations without delaminating.

Another object of our invention is to provide a method for cladding copper on steel wherein the labor costs of the process are independent of the thickness of the copper coating.

These and other objects and advantages of our invention will become apparent from the following detailed description.

As noted above, prior art ATR mixtures for depositing copper or copper alloy phases have all been characterized by one disadvantage or another. The pure cupric oxide (CuO) and aluminum mixture reacts very violently vaporizing much of the reduced metal phase. Substitution of cuprous oxide ($Cu_2O$) or metallic copper for cupric oxide (CuO) does reduce the violence of the reaction but renders a very high melting point slag which causes defects in the surface of the deposited metal. Accordingly, the preferred prior art practice has been to add fluxing materials such as lime or fluorite to the mixture which not only reduces the violence of the reaction, but tends to flux the slag reducing its melting point and thereby resulting in an improved surface on the deposited copper. These ATR mixtures are still not ideally suited because large amounts of the fluxing materials are necessary thereby adding to the cost of the mixture. In addition, the resulting slag, although having a lower melting point than pure alumina ($Al_2O_3$) is still significantly higher than the melting point of copper, and hence surface defects do result.

The crux of this invention is based on our discovery that a calcium-silicon alloy added to a specifically formulated ATR mixture containing both cupric oxide and approximately 33% metallic copper, not only retards the reaction to an ideal rate, but also yields a unique slag having an exceptionally low melting point, i.e. about 1170° C, so that the resulting metal deposit is free from surface defects due to early solidification of the slag phase. We have preferred to use a calcium-silicon alloy available commercially from Union Carbide Corporation which consists of about 30–33% Ca, 60–63% Si with the balance being normal impurities, such impurities preferably not including more than 3% iron. Although other calcium-silicon alloys are commercially available, these other alloys are less desirable because they contain more impurities or lesser amounts of calcium.

The preferred ATR mixture of this invention is one which consists of 50–65 wt.% CuO, 1.8–2.4 wt.% Al, 10–13 wt.% Ca-Si alloy and 20–38 wt.% metallic copper and/or other metallic constituent to be alloyed with copper. For optimum results, the mixture should be about 54 wt.% CuO, 2 wt.% Al, 11 wt.% Ca-Si alloy and 33 wt.% copper and/or other metal. The real crux of this invention is two-fold. Firstly, the addition of copper or other nonreacting metallic constituent constituting about one-third of the mixture by weight, is essential to retard the reaction to prevent the generation of an excess degree of superheat and keep to a minimum the amount of slag formed. Secondly, the proper ratio of calcium, silicon, aluminum and copper oxide must be maintained to produce a slag having an exceptionally low melting point temperature. Hence, a broader aspect of the inventive mixture is not only to provide about ⅓ metallic constituents, but also to proportion the calcium, silicon, aluminum and copper oxide so that the reaction product slag will consist of approximately 60–65 wt.% silicon dioxide ($SiO_2$), 20–25 wt.% clacium oxide (CaO) and the balance alumina ($Al_2O_3$). For optimum results, i.e. lowest possible melting point slag, the composition thereof should be about 62 wt.% $SiO_2$, 23 wt.% CaO and 15 wt.% $Al_2O_3$. The above specified ATR mixture will produce such a slag.

In view of the above, it can be seen that the broadest aspect of this invention is to provide an ATR mixture for depositing copper or copper alloys in which 28 to 50% of the metallic phase is derived from non-reactive metallic constituents and which produces an exceptionally low melting point slag consisting of about 60–65 wt.% $SiO_2$, 20–25 wt.% CaO and the balance $Al_2O_3$. It should be obvious that this result can be achieved with mixtures other than the preferred mixture specified above, provided, of course, the mixture is balanced to provide the same slag and heat output.

As noted above, the optimum advantages of this invention are realized only if the resulting ATR slag is approximatly 62% $SiO_2$, 23% CaO and 15% $Al_2O_3$, as only this combination of oxides will yield the lowest possible melting point of 1170° C. It is apparent however that modest deviations from this optimum composition will not greatly raise the slag's melting point temperature, and hence should provide good results. As long as the only reactive constituents are cupric oxide, aluminum and calcium-silicon alloy, the mixture must contain 50–65% CuO, 1.8–2.4% Al, 10–13% Ca-Si alloy with the balance being inert metallics such as copper, in order to yield the desired slag. Only when other reactive constituents such as cuprous oxide and/or metallic oxides are to be used, will the above oxide, aluminum and alloy relationship be altered. Thus, if one must use cuprous oxide and/or other metallic oxides in his ATR mixture, he must recalculate the amount of each reactant for the mixture so as to approximate the desired slag product, i.e. 62% $SiO_2$, 23% CaO and 15% $Al_2O_3$.

In view of the above, it is apparent that for the deposition of a pure metallic copper phase in accordance with this invention, one should preferably utilize an ATR mixture consisting of 50–65% CuO, 1.8–2.4% Al, 10–13% Ca-Si alloy with a balance of metallic copper. Ideally, this material should all be finely divided, i.e. preferably less than 8 mesh and thoroughly mixed. Exothermic reaction of this mixture will proceed rapidly, but not violently, yielding a molten copper phase and a molten slag phase thereover having approximately the desired composition to minimize its melting point. Upon solidification, the underlying copper layer will be reasonable smooth without surface defects.

In order to deposit copper alloys, it is preferable to use the same combination of cupric oxide, aluminum and calcium-silicon alloy, i.e. 50–65% CuO, 1.8–2.4% Al and 10–13% Ca-Si alloy, and then add the alloy constituent as a substitute or partial substitute for the metallic copper. For example, to produce a copper-nickel alloy of 85% Cu and 15% Ni, one could use a mixture of 54% CuO, 2% Al, 11% Ca-Si alloy, 22% metallic copper and 11% metallic nickel. Although it would be possible to obtain part or all of the nickel content by reduction thereof from a nickel oxide, this would then necessitate recalculation of the relative amounts of oxide, aluminum and Ca-Si alloy so as to assure a suitable low melting point slag.

In order to utilize the above described ATR mixtures in the deposition of copper or copper alloys onto a steel substrate, it is preferable that the steel substrate be preheated to at least 500° C, and preferably 700°–1,000° C, to assure a good bond of the copper deposit. Contrary to prior art practices however, preheating of the substrate is not absolutely essential to the practice of this process, as indeed good copper or copper alloy deposits can be effected without preheating the substrate. Without preheating to at least 500° C however, there may at times, particularly for small substrate pieces, be a tendency to get poor bonding at the edges of the deposit. In the preferred practice of this process therefore, the steel substrate is preheated and, of course, a containment means must be provided to contain the ATR mixture and reaction products. To this end, we prefer to use a graphite perimeter system as described in U.S. Pat. No. 3,856,076. A predetermined amount of the above described ATR mixture is then placed within the perimeter system. The amount of ATR mixture used should, of course, be determined on the basis that the copper and alloy content thereof should match the amount of copper and alloy desired in the deposit. When the mixture is deposited onto the preheated substrate, it is ignited and the mixture will react to form molten copper or copper alloy and slag. These two phases will quickly separate, with the metal settling to the bottom with the slag thereover. Subsequently, the slag phase will solidify at about 1,170° C and the copper or copper alloy shortly thereafter, e.g. pure copper at 1,083° C. Since the slag remains molten for a much longer period of time, as contrasted to prior art practices, there is a greater opportunity for complete separation of the two phases, and less likelihood for gases or other matter to be trapped under the slag to cause defects in the copper surface. When both phases have solidified, the perimeter is removed, and the overlaying slag layer broken away to expose the copper or copper alloy clad to the steel substrate.

An unexpected result of the application of this process has been the copper coating itself. Microscopic examination of such copper or copper alloy coatings has revealed the presence of ferrite therein as discrete small globules. Unlike pure copper, such coatings are magnetic. Such magnetic coatings could perhaps be useful for some applications. On the other hand, if the presence of ferrite is not desired, then it is necessary to apply the copper coating in two steps. Specifically, a thin "buttering" deposit is first applied which will contain some ferrite. Thereafter, a second copper or copper alloy is deposited over the buttering deposit. Since the second deposit is applied onto a copper or copper alloy base, there will be practically no iron therein picked up from the substrate.

The following examples are presented to better illustrate the advantages of this invention.

EXAMPLE 1

A 2- by 2- by ½-inch-thick carbon steel substrate was heated to 1,500° F in a muffle furnace and then transferred to a sand pit. After installation of a 2-inch-tall, 1½-inch I.D. section of graphite pipe (refractory perimeter) as a mold on top of the substrate, 50 grams of granular reaction mixture (81% CuO, 16% Ca-Si alloy, 3% Al) was poured into the graphite mold and ignited. When the reaction was complete and after the products had partly cooled and solidified, the graphite mold and the slag phase were removed to reveal an approximately one-eighth-inch-thick, uniform deposit of copper on the steel substrate. The clad composite was hot rolled at 1,850° F to a thickness of about 0.125 inch. A section of hot-rolled material was cold rolled to a thickness of about 0.010 inch. The copper coating did not delaminate or tear during either of the rolling operations. As a final test of the quality of the copper coating, a section of the cold-rolled composite was immersed in concentrated hydrochloric acid until the carbon-steel substrate had completely dissolved leaving the copper coating apparently unaffected. No holes or cracks in the coating could be found.

EXAMPLE 2

An ATR reaction mixture, consisting of 40.5 g. cupric oxide (CuO), 8.0g calcium-silicon alloy (Ca-Si), 1.5g. aluminum (Al), 15.0g. copper metal and 10.0g. nickel metal, was reacted on the surface of a 2¼- by 2¼- by ½-inch-thick cold (not preheated) steel substrate, using a 3-inch-long section of 1 ½-inch I.D. graphite pipe as a container. After the assembly had cooled, the graphite container and ATR-slag phase were removed to reveal an approximately ¼-inch-thick layer of a copper-nickel alloy (about 17 percent Ni) which had been deposited on the steel substrate. A section through the composite revealed that the ATR copper-nickel alloy deposit was metallurgically bonded to the steel substrate surface.

EXAMPLE 3

To produce two additional copper alloys, copper + 17% tin (Sn) and copper + 17% cobalt (Co), the above procedure was repeated, except that the 10g. of nickel metal used in the original mixture was replaced with 10g. of tin metal and 10g. of cobalt metal, respectively. The resulting ATR copper-alloy deposits were also found to be metallurgically bonded to the steel substrates. Presumably, other binary copper alloys can be produced in a similar fashion. Further, the degree of alloying can be controlled by simply varying the ratio of the copper metal addition to the alloy metal addition. In the extreme case where all of the copper metal addition is replaced with an alloying metal, a copper alloy containing about 44 percent of alloying metal would be produced.

We claim:

1. A method of cladding a steel substrate with copper and copper alloys comprising:
    a. placing a refractory perimeter system onto said steel substrate,
    b. depositing onto said substrate within said perimeter system an aluminothermic reduction mixture consisting essentially of 50–65 wt.% cupric oxide, 1.8–2.4 wt.% aluminum; 10–13 wt.% of a calcium-silicon alloy; and 20–38 wt.% of a metal selected from the group consisting of copper, metal desired to be alloyed with copper and mixtures thereof; said calcium-silicon alloy consisting essentially of 30–33 wt.% calcium, 60–63 wt.% silicon and the balance being normal impurities,
    c. igniting the mixture to form a molten metal phase and molten slag phase,
    d. allowing the molten phases to solidify and cool,
    e. removing the refractory perimeter system and slag phase to reveal a tightly adherent metallic cladding on the steel substrate.

2. A method according to claim 1 in which said steel substrate is preheated to at least 500° C before the mixture is deposited thereon.

3. A method according to claim 2 in which said steel substrate is preheated to a temperature of 700°–1,000° C.

* * * * *